(12) United States Patent
Nishida

(10) Patent No.: US 6,373,600 B1
(45) Date of Patent: Apr. 16, 2002

(54) LIGHT-RECEIVING ELEMENT UNIT, A METHOD AND DEVICE FOR DIGITAL IMAGE INPUT

(75) Inventor: Shinsuke Nishida, Tokyo (JP)

(73) Assignee: Fourie, Inc., Tokyo (JP)

( * ) Notice: Subject to any disclaimer, the term of this patent is extended or adjusted under 35 U.S.C. 154(b) by 0 days.

(21) Appl. No.: 09/161,381

(22) Filed: Sep. 28, 1998

(51) Int. Cl.$^7$ ................................................ H04N 1/04
(52) U.S. Cl. ...................... 358/474; 382/270; 348/14.1; 375/240.14; 345/155
(58) Field of Search ................................ 358/406, 461, 358/474, 400, 401, 462, 464, 445, 446, 447; 382/270, 772, 286, 279; 348/14.1; 375/240.14

(56) References Cited

U.S. PATENT DOCUMENTS

| | | | | |
|---|---|---|---|---|
| 5,014,332 A | * | 5/1991 | Nakajima | 382/50 |
| 5,311,328 A | * | 5/1994 | Murata | 358/447 |
| 5,717,201 A | * | 2/1998 | Lin | 250/214 |
| 5,752,126 A | * | 5/1998 | Muramasu | 399/46 |
| 5,892,590 A | * | 4/1999 | Ida | 358/406 |

FOREIGN PATENT DOCUMENTS

WO        WO 96/25710        * 8/1996

* cited by examiner

Primary Examiner—Jerome Grant, II
Assistant Examiner—Negussie Worku
(74) Attorney, Agent, or Firm—Sughrue Mion, PLLC

(57) ABSTRACT

An A/D converter converts analog data received from a light-receiving element via an amplifier to digital data. From the A/D converter, digital data is transmitted via a multiplier to a comparing circuit. The comparing circuit compares the digital data with a reference data, and when the absolute value of the difference thereof is equal to or more than a present threshold value outputs the digital data to the switch circuit via the multiplier, and also updates the reference value. Then the reference data is updated with the digital data. When a bus line is idle, a controller switches output from the switch circuit and outputs the digital data to the bus line. Then address data and time code are appended to the digital data.

18 Claims, 13 Drawing Sheets

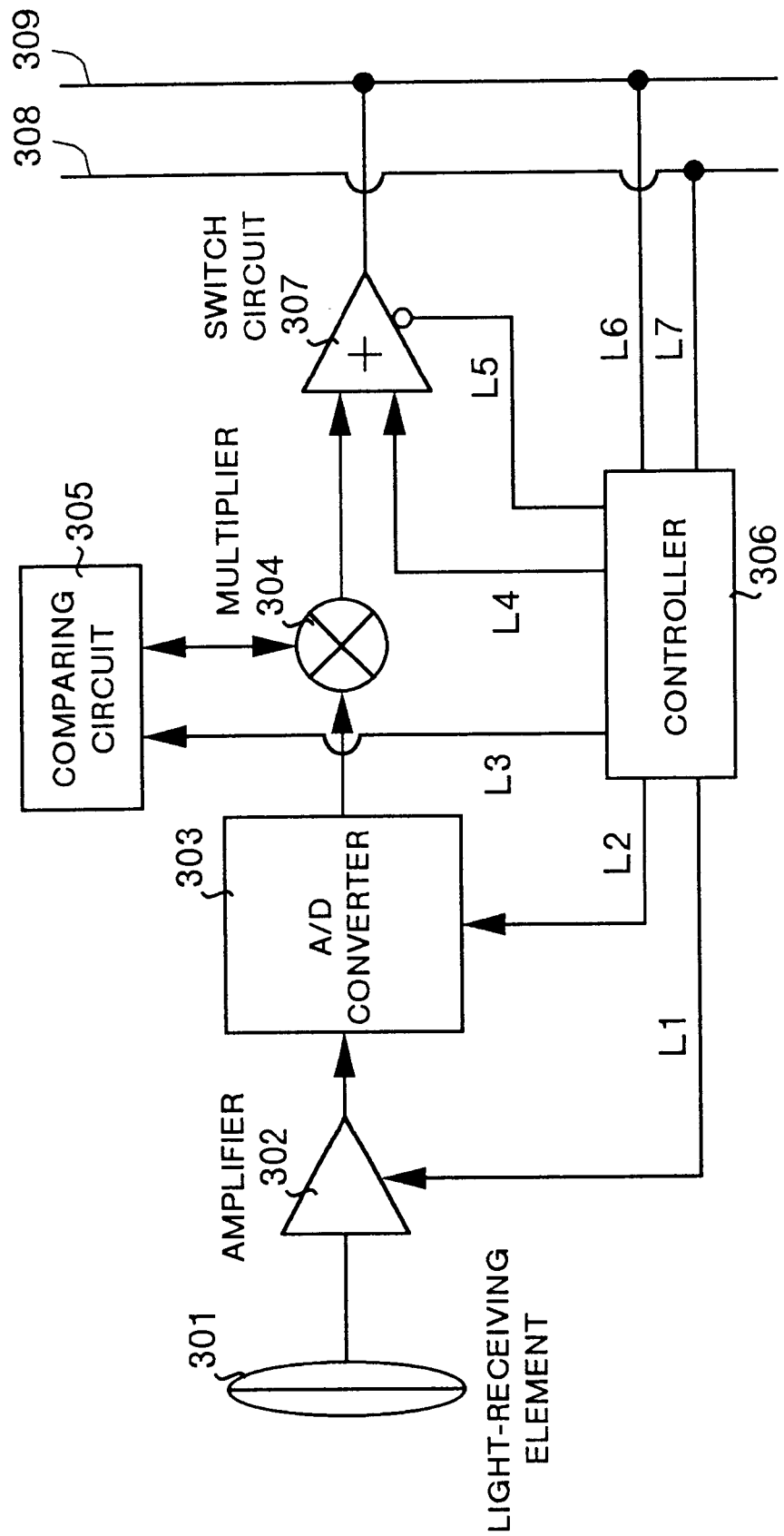

RESOLUTION (LEVEL 2)
n VALUE = 2

FIRST RECTANGULAR AREA ($2^2 \times 2^2$)

RESOLUTION (LEVEL 3)
n VALUE = 3

FIRST RECTANGULAR AREA ($2^3 \times 2^3$)

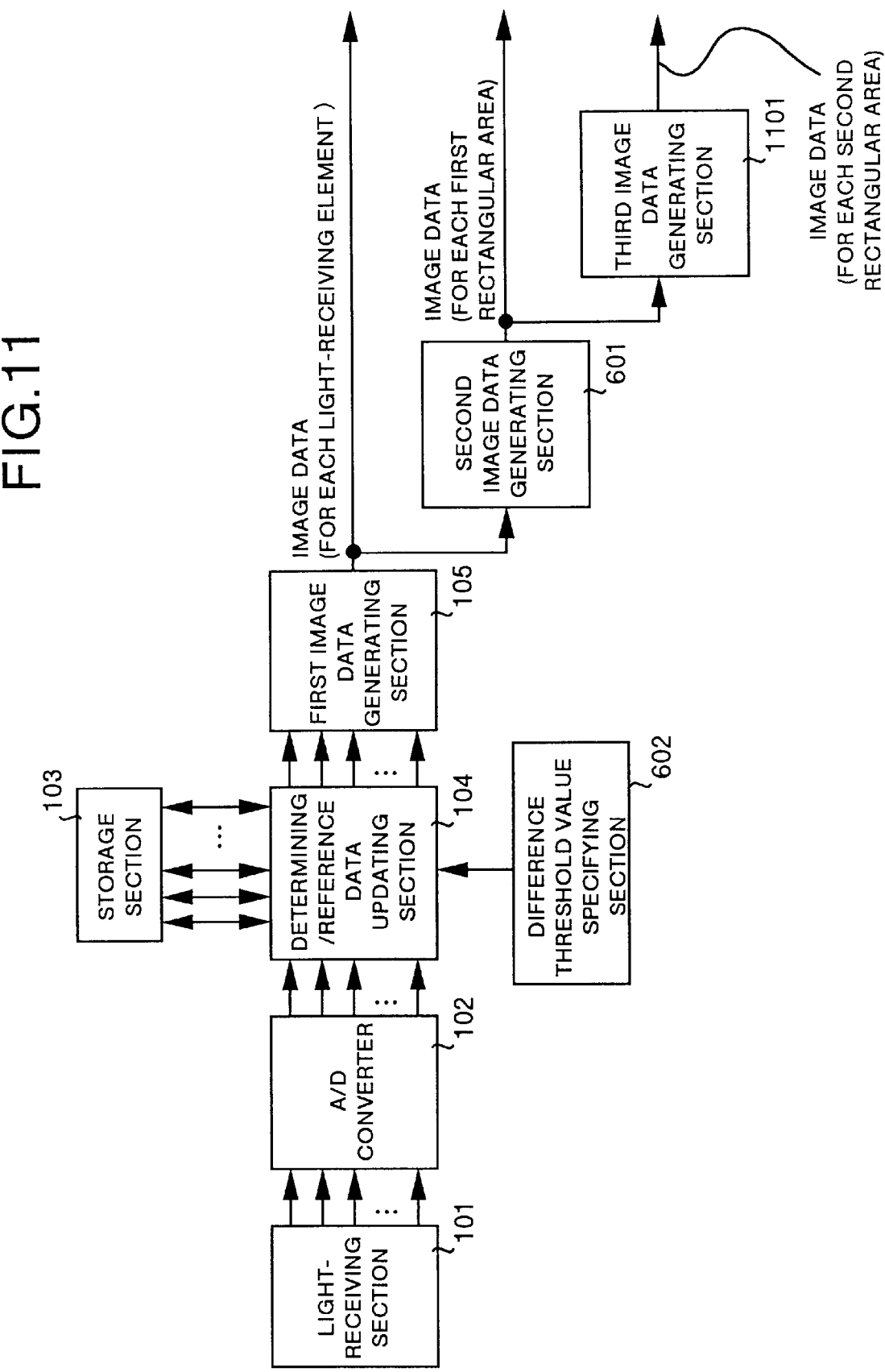

FIRST RECTANGULAR AREA
(n=1 : 2×2 LIGHT-RECEIVING ELEMENT)

SECOND RECTANGULAR AREA
(m=1 : 2×2 FIRST RECTANGULAR AREA)

FIRST RECTANGULAR AREA

FIRST RECTANGULAR AREA

SECOND RECTANGULAR AREA
(m=2 : 4×4 FIRST RECTANGULAR AREA)

LIGHT-RECEIVING ELEMENT UNIT, A METHOD AND DEVICE FOR DIGITAL IMAGE INPUT

FIELD OF THE INVENTION

The present invention relates to a light-receiving unit, and a method and device for digital image input for converting analog data generated by a light-receiving element to digital data and inputting the digital data as image data. The invention relates more specifically to a light-receiving unit, a method and device for digital image input for determining whether image data is to be generated or not according to a change rate of analog data (voltage value) generated by converting the light into an electricity signal with a light-receiving element according to amplitude of the received light.

BACKGROUND OF THE INVENTION

In a digital image input device based on the conventional technology such as a CCD camera, a plurality of CCD (a solid image pick-up element or a light-receiving element) each capable of converting received light to electricity according to amplitude of the received light are arranged in a matrix form. Voltage values (analog data) generated by each CCD are acquired by successively scanning at a specified sampling cycle and the values are converted to digital data and inputted as image data.

In this way, image data inputted at each scan is an image data corresponding to each of the CCDs arrayed in a matrix form. In other words, assuming that all the CCDs arrayed in a matrix form a screen, image data for one screen is inputted by scanning once. For instance, when a digital image input device is a digital camera, image data for one screen inputted at one scan is equivalent to a sheet of still image. When a digital image input device is a video camera, image data for several tens of screens per unit time (namely, a dynamic picture) is acquired by scanning several tens of times per unit time.

However, image data for one screen is generated and inputted unconditionally according to analog data (voltage values) obtained by scanning with CCDs arrayed in a matrix form at a specified sampling cycle, so that there occur the problems as described below.

Main object of photography or shooting is to record changes in the state of an object or a space. However, with the scan line system based on the conventional technology, even when there is no change in the state of the object or the space, image data is generated and inputted by unconditional scanning the state of the object or the space at a specified sampling cycle. Thus, when there is no change in the state of an object or space, image data is unnecessarily generated and inputted. Especially, when a state of an object or a space changes little but the photography or shooting is executed for a long period, a quantity of image data disadvantageously becomes large.

Any screen comprising CCDs arrayed in a matrix form is taken as a unit for input of image data, and even when only a particular portion of image data for one screen changes, image data for one screen is generated and inputted. Thus, in the image data for one screen, a lot of unnecessary image data having no special information is generated and inputted.

Thirdly, in the conventional technology, a sampling cycle (in other words, a time interval at which the image data is generated and inputted) for acquiring analog data (voltage values) from each CCD is restricted by preset requirements. For instance, in a case of sampling cycle at which image data for 60 screens (frames) is inputted per second, a time interval between image data of one screen and its privious or next screen is 1/60 second. When the image data inputted at this rate is reproduced slowly, screens acquired at a time interval corresponding to a sampling cycle are reproduced with a timely extended interval, so that the reproduced images look like thinned ones and a smoothness in the movements is lost. When the sampling cycle is made shorter, the smoothness in slow reproduction can be improved, however, in this quantity of image data increases.

SUMMARY OF THE INVENTION

It is an object of the present invention to enable generation and input of the image data corresponding only to changes in the state of an object or a space.

It is another object of the present invention to enable input of image data corresponding to the changes in state with each light-receiving unit such as a CCD for the purpose to evade generation and input of unnecessary image data not including change in state (unnecessary information) to reduce a quantity of data to be processed and improve efficiency in input of image data.

It is another object of the present invention to suppress increase of image data and improve smoothness in reproduction even at a low speed.

Other objects and features of this invention will become clear from the following description with reference to the accompanying drawings.

In the light-receiving element unit according to the present invention, an A/D converting unit converts analog data of each light-receiving element into digital data, a storage unit stores a reference data, a determining unit decides that the digital data to be used for generation of the image data when an absolute value of a difference between the digital data and the reference data is equal to or more than a preset threshold value, an image data generating unit generates the image data, and a reference data updating unit updates the reference data, so that image data is generated only when there is a change of state of the object or the space and unnecessary data is not generated.

In the digital image input device according to the present invention, an A/D converting unit converts the analog data from the plurality of light-receiving elements into digital data, a storage unit stores a reference data, a determining unit decides that the digital data to be used for generation of the image data when an absolute value of a difference between the digital data and the reference data is equal to or more than a preset threshold value a first image data generating unit appends a specific address data and a time code for identification of the image data, a reference data updating unit updates the reference data, so that image data is generated only when there is a change of state of the object or the space and unnecessary data is not generated.

In the digital image input method according to the present invention, a change rate of a voltage value generated in a light-receiving element is accumulated, and when the accumulated value of change rate is out of a preset range, image data is generated and inputted by using the voltage value at the point of time, so that image data is generated only when there is a change of state of the object or the space and unnecessary data is not generated.

In the digital image input method according to the present invention, a voltage value sampled last with a prespecified sampling cycle is compared to a previous voltage value used for generating the previous image data for each light-receiving element, and when an absolute value of a difference between the previous voltage value and the current voltage value is equal to or larger than a preset threshold value, the previous voltage value is updated to the current voltage value, and image data is generated and inputted by using the current voltage value, so that image data is generated only when there is a change of state of the object or the space and unnecessary data is not generated.

In the digital image input method according to the present invention, light is received in a light-receiving section having a plurality of light-receiving elements, a voltage value is obtained based on the amplitude of the light, a difference is obtained between the voltage value and a reference value, the voltage value is used for generation of image data when absolute value of the difference is larger than a preset threshold value, a first image data is generated using the voltage value, a specific address data and time code is appended to the first image data, and the reference data is updated using the using the voltage value, so that image data is generated only when there is a change of state of the object or the space and unnecessary data is not generated.

BRIEF DESCRIPTION OF THE DRAWINGS

FIG. 3 is an explanatory view showing general configuration of a light-receiving element unit according to Embodiment 1;

FIG. 11 is a block diagram showing a digital image input device according to Embodiment 4 of the present invention;

DESCRIPTION OF THE PREFERRED EMBODIMENTS

Detailed description is made for a light-receiving element unit, a digital image input device, and a digital image input method according to the present invention in the order of Embodiment 1, Embodiment 2, Embodiment 3, Embodiment 4 and Embodiment 5 with reference to the related drawings.

Description is made below for Embodiment 1 of the present invention in the order of (1) Outline of the digital image input device according to Embodiment 1, (2) Basic configuration of the light-receiving unit and (3) Operations of the digital image input device according to Embodiment 1 with reference to the related drawings.

(1) Outline of the Digital Image Input Device According to Embodiment 1

The digital image input device according to Embodiment 1 of the present invention compares a current voltage value sampled at a specified sampling cycle to a previous voltage value used for generation of previous image data for each light receiving element and updates the previous voltage value to the current voltage value when an absolute value of a difference between the previous voltage value and current voltage value is equal to or more than a preset threshold value for the difference, and generates and input image data using the current voltage value.

Figure 1:
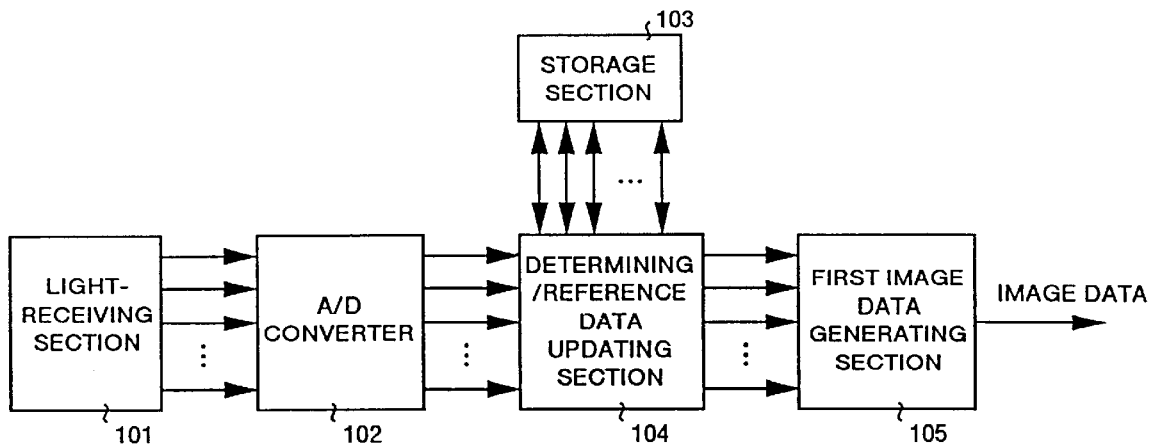
FIG. 1 is a block diagram showing a digital image input device according to Embodiment 1 of the present invention.

FIG. 1 is a block diagram showing the digital image input device according to Embodiment 1 of the present invention. This digital image input device comprises a light-receiving section 101 consisting of a plurality of light-receiving elements each capable of outputting a voltage value (analog data) according to amplitude of the received light, an A/D converter 102 for receiving voltage values from each light-receiving element and converting the voltage values (analog data) to digital data, a storage section 103 for storing therein reference data used for determination as to whether image data is to be generated or not, a determining/reference data updating section 104 for receiving digital data corresponding to each light-receiving element from the A/D converter 102, computing a difference between the digital data and the reference data stored in the storage section 103, determining, when an absolute value of the difference is equal to or more than a preset threshold value, that the digital data from the light-receiving element is digital data to be used for generation of image data and updating reference data for the light-receiving element in the storage section 103 by using the digital data when it is determined that the digital data is to be used for generation of image data, and a first image data generating section 105 for appending, when it is determined by the determining/reference data updating section 104 that the digital data is to be used for generation of image data, specific address data preset for each light-receiving element and time code indicating a time for generation of image data to the digital data to generated image data for the light-receiving element.

It should be noted that, although only portions relating to the present invention are shown for convenience of explanation in FIG. 1, the digital image input device according to this embodiment has naturally an operational display section, a central control unit for providing controls over operations of the device as a whole, a storage device for storing therein received image data, an interface unit for transferring the image data or the like, all of which are provided in ordinary digital image input devices.

Figure 2:
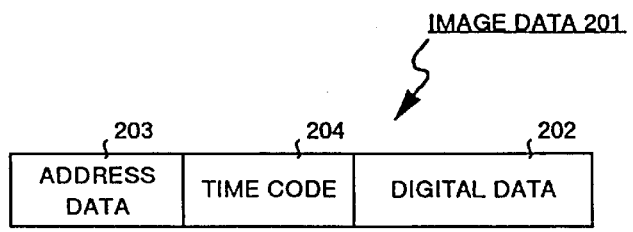
FIG. 2 is an explanatory view showing data structure of image data in Embodiment 1.

FIG. 2 shows data structure of image data in Embodiment 1. In the image data 201, address data 203 specific to a corresponding light-receiving element and time code 204 indicating a time of generation of image data are appended to the digital data 202 determined by the determining/ reference data updating section 104 as a data to be used for generation of image data. Thus, the image data 201 in Embodiment 1 is generated discretely for each light-receiving element.

(2) Basic Configuration of the Light-receiving Element

In the digital image input device according to Embodiment 1, image data is generated and inputted by each light-receiving element, and all the functions shown in FIG. 1 are realized for each light-receiving element. Therefore, description is made only for one of the light-receiving element in this Embodiment 1.

FIG. 3 shows general configuration of the light-receiving element unit according to Embodiment 1. This light-receiving element unit comprises a light-receiving element 301, an amplifier 302, an A/D converter 303, a multiplier 304, a comparing circuit 305, a controller 306 and a switch circuit 307. 308 indicates a line carrying a control signal from a central control section (not shown) and 309 is a bus line for transferring image data.

The light-receiving element 301 converts received light to electricity and outputs a voltage value (analog data) according to amplitude of received light. The amplifier 302 amplifies and outputs analog data inputted from the light-receiving element 301 according to a gain adjusted by the controller 306.

The A/D converter 303 converts analog data inputted from the amplifier 302 to digital data. The digital data outputted from the A/D converter 303 is at first transferred via the multiplier 304 to the comparing circuit 305.

The comparing circuit 305 has a register therein, and reference data used for determination as to whether image data is to be generated or not is stored in this register. This reference data corresponds to the previous voltage value (herein, digital data used for generation of previous image data) for generation of the previous image data. The current digital data transferred via the multiplier 304 is compared in the comparing circuit 305 with the reference data. When an absolute value of the difference thereof is equal to or more than a threshold value inputted via the control line L3 from the controller 306, the current digital data is outputted via the multiplier 304 to the switch circuit 307, and the current digital data is set in the register as an updated reference data.

Digital data outputted from the comparing circuit 305 is inputted to one of the two input terminals of the switch circuit 307. To the other terminal is inputted an address data for the corresponding light-receiving element 301 and a time code indicating a time at which the image data was outputted from the light-receiving element 301 by the controller 306. On the other hand, the controller 306 monitors an idle state of the bus line 309 using the control line L6, switches the switch circuit 307 to output the data using the control line L5 when the bus line 309 is idle, and outputs the address data, time code, and digital data to the bus line 309. In the switch circuit 307, the address data and time code are appended to the digital data.

The control line L1 is a line for adjusting a gain of the amplifier 302, control line L2 is a line for adjusting characteristics of the A/D converter 303, control line L4 is a line for appending address data and time code to digital data, and control line L7 is a line for inputting a gain for an amplifier, a threshold value for a difference, a clock signal for time code or the line via the control signal line 308 from the central control section (not shown herein).

As clearly understood from the configuration described above, in the light-receiving element unit shown in FIG. 3, not only the photoelectric conversion characteristics of each light-receiving element 301 (namely non-uniformity in sensitivity) but also a gain of the amplifier 3 can be adjusted. Generally non-uniformity in sensitivity of the light-receiving element such as CCDs can not be evaded, so that the possibility of gain adjustment for the amplifier 302 is extremely useful. Also as shown in FIG. 2, as the address data 203 and time code 204 each for the light-receiving element 301 are included in the image data 201, it is possible to automatically execute gain adjustment for each light-receiving element by means of feedback control using the image data inputted from a plurality of light-receiving elements. Similarly, the characteristics of the A/D converter 303 can be adjusted, so that reliability and precision of image data can be improved further.

Figure 4A:
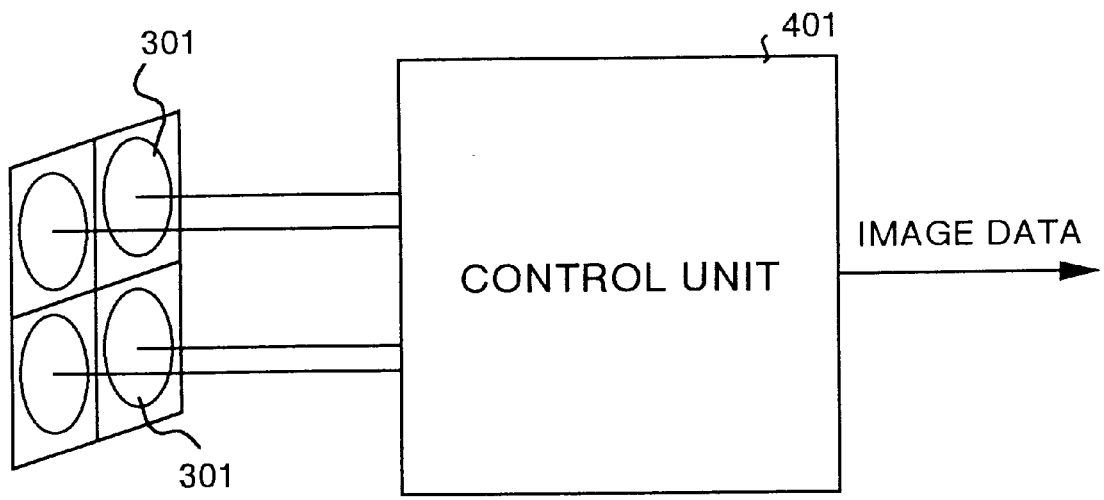
FIGS. 4A and 4B are explanatory views showing another configuration of the light-receiving element unit.
Figure 4B:
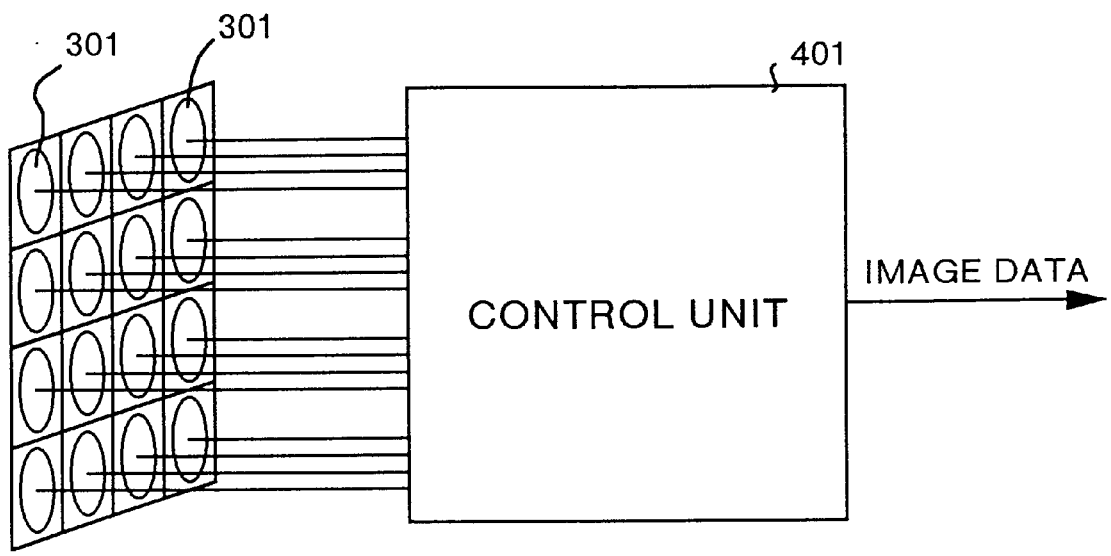

It should be noted that, although the light-receiving element unit shown in FIG. 3 is prepared for each light-receiving element 301, the configuration is not limited to that described above. As shown in FIG. 4A, 4 light-receiving elements 301 may be grouped and connected to a control unit 401. Alternately, as shown in FIG. 4B, 16 pieces of light-receiving elements 301 may be grouped and connected to a control unit 401. In this case also, image data with address data specific to each light-receiving element 301 for appending thereto is generated.

(3) Operations of the Digital Image Input Device According to Embodiment 1

Figure 5:
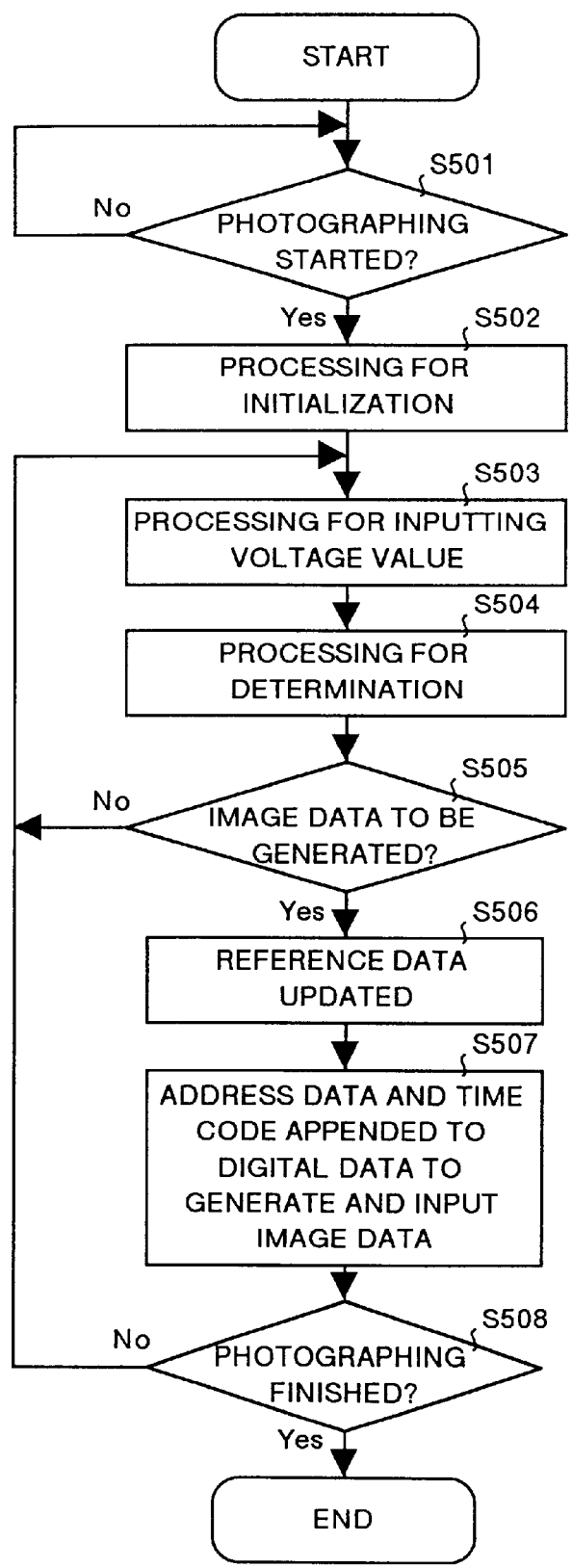
FIG. 5 is a flow chart for input of image data in Embodiment 1.

Operations of the digital image input device according to Embodiment 1 are explained with reference to FIG. 1 and FIG. 5. FIG. 5 is a general flow chart showing the image data input processing.

At first, when photographing with the digital image input device is started (S501), reference data stored in the storage section 103 is initialized (S502). The reference data is initialized in this step to generate and input all of analog data inputted from the light-receiving section 101 first of all, and this processing is required to input a still picture with a digital image input device. However, such an initialization is not required when only a moving picture is to be inputted with a digital image input device.

Next, a processing for inputting a voltage value is executed to input voltage values (analog data) for each light-receiving element from the light-receiving section 101, and converts the voltage values to digital data in the A/D converting section 102 (S503). The timing for inputting voltage values (analog data) for each light-receiving element from the light-receiving section 101 is based on a clock signal for time code outputted from the central control unit (namely a sampling cycle). This clock signal has a clock frequency sufficiently higher as compared to a sampling cycle in the conventional type of scanning line system (for instance, $\frac{1}{60}$ sec, $\frac{1}{120}$ sec). In the conventional type of system the sampling cycle is set according to requirements of a digital image output device such as a CRT or a monitor. However, in Embodiment 1 sampling cycle is set according to sensitivity of a light-receiving element such as a CCD and hence it becomes possible to set the sampling cycle higher.

The determining/reference data updating section 104 computes a difference, for each of the light-receiving element, between the inputted digital data and the reference value for each light-receiving element stored in the storage section 103, and determines, when an absolute value of the difference is equal to or more than a preset threshold value, that the digital data for the light-receiving element is to be used for generation of image data (S504).

It is checked (S505) whether it has been determined in step S504 that the digital data is to be used for generation of image data. When it is determined that the digital data is to be used for generation of image data, reference value for corresponding light-receiving element stored in the storage section 103 is updated with this digital data (S506), image data is generated by appending address data and time code to the digital data, and is inputted as image data (S507). Then it is determined whether photographing is to be terminated or not (S508), and the processing is terminated when it is determined in step S508 that photographing is to be terminated, otherwise the system control returns to step S503.

On the other hand, if it is determined in step S505 that the digital data is not to be used for generation of image data, system control returns to step S503.

As described above, with Embodiment 1, determination as to whether image data is to be generated or not is made according to an amount of change in the analog data generated by executing photoelectric conversion with a light-receiving element according to amplitude of received light and the input of image data is executed, so that image data is generated and inputted only when there is a change in the state of an object or a space. Thus unnecessary image data having no useful information is not generated.

Furthermore, image data for those light-receiving elements for which a change in state has occurred is only generated, so that generation and input of unnecessary image data (unnecessary information) can be suppressed to a minimum level and also it becomes possible to reduce a quantity of information to be processed and to improve efficiency in input of image data.

When image data generated and inputted with the digital image input device according to Embodiment 1 is outputted (reproduced) with a dedicated digital image output device having the same number of display elements as the light-receiving elements and also capable of outputting image data with each discrete display element, a corresponding element can easily be identified according to address data included in the image data, and also timing for display can accurately be controlled according to the time code included in the image data.

Also with Embodiment 1, timing for generation of image data is decided not according to a time interval restricted by a sampling cycle (for instance, 1/60 sec, or 1/120 sec) like in the conventional type of scanning line system, but according to a point of time when it is determined that there has been generated any change in the previous image data (digital data) (namely at a point of time when the change rate is more than a threshold value for the difference), so that image data for a light-receiving element can be generated not depending on a periodical time interval, but at a point of time when it is determined that there has occurred any change in the image. For this reason, image data (including time code) is generated at the timing when there occurs any change in an image, so that smoothness of the image is improved as compared to that in the conventional technology. This improvement in smoothness of an image becomes especially remarkable when the image is reproduced at a slow speed. Also there is a difference from the scanning line system based on the conventional technology, in that, only image data having a change is generated, so that the entire volume of information can be reduced. In other words, increase of image data can be suppressed and smoothness of an image when reproduced slowly can be improved. The digital image input device according to Embodiment 2 of the present invention generates image data by grouping, in addition to the image data for each light-receiving element generated in the first image data generating section 105 of the digital image input device according to Embodiment 1 of the present invention shown in FIG. 1, image data for each light-receiving element within a specified rectangular area into one image data.

Figure 6:
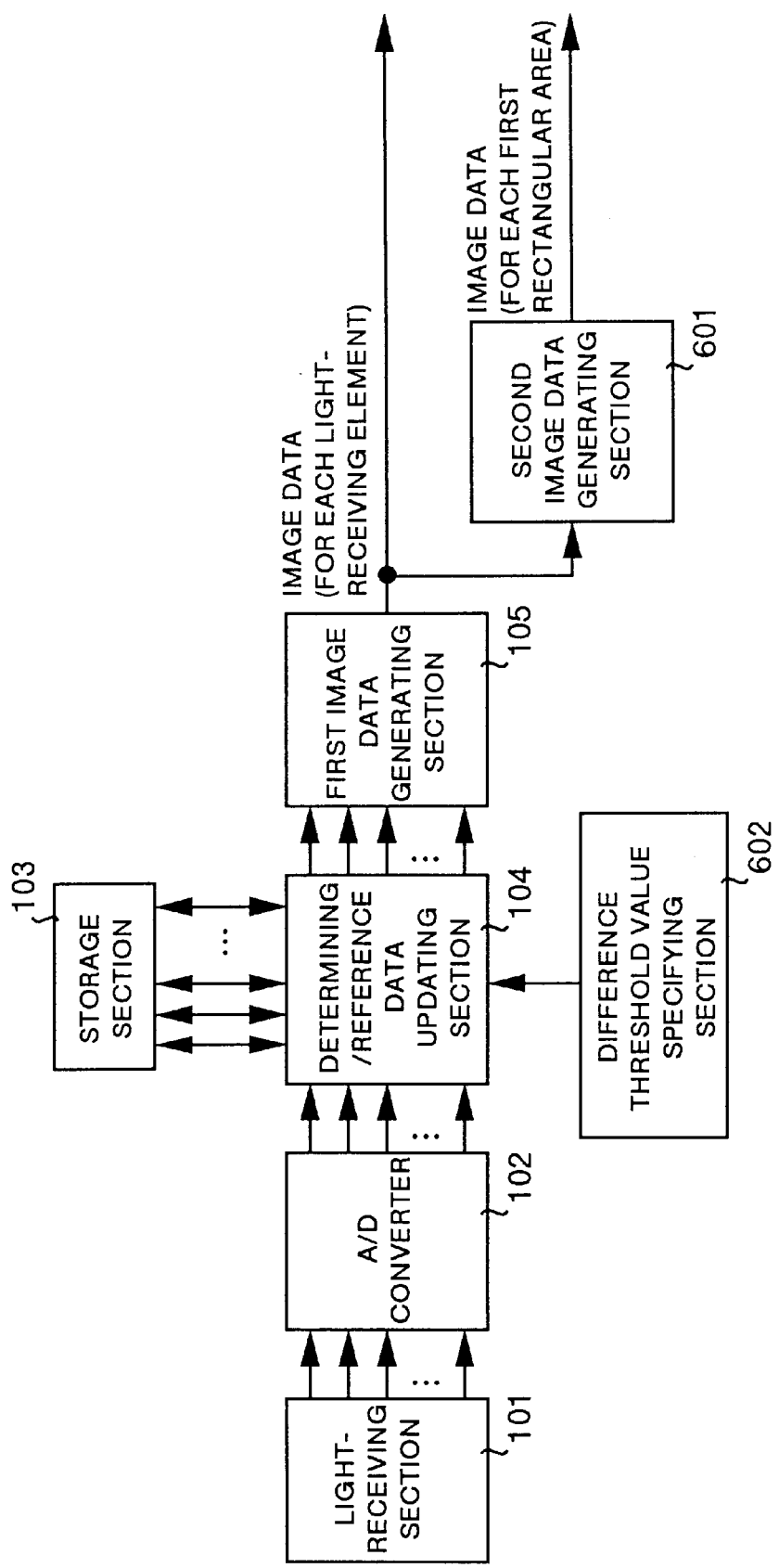
FIG. 6 is a block diagram showing a digital image input device according to Embodiment 2 of the present invention.

FIG. 6 is a block diagram showing the digital image input device according to Embodiment 2. The digital image input device according to Embodiment 2 comprises a second image data generating section 601 for inputting image data for each light-receiving element generated in the first image data generating section 105, extracting from address data and time code appended to the image data average data image data, address data for the light-receiving element of which is address data within a first rectangular area comprising preset $2^n \times 2^n$ (n: natural number) number of light-receiving elements and has the same time code, computing average data obtained by averaging digital data in the corresponding $2^n \times 2^n$ pieces of image data when there are $2^n \times 2^n$ pieces of extracted image data and at the same time non-uniformity of digital data in the $2^n \times 2^n$ pieces of image data is within a specified range, and appending specific address data preset for the first rectangular area and time code to the average data to generated image data for the first rectangular area. There is a difference threshold value specifying section 602 for changing a threshold value for the difference in the determining/reference data updating section 104. The basic configuration is the same as that in Embodiment 1, so that description is made herein only for the different portions.

The difference threshold value specifying section 602 changes a threshold value for difference in the determining/reference data updating section 104, and for instance, an operating display section of a digital image input device can be used for this purpose. By changing the threshold value for difference with the difference threshold value specifying section 602, probability of generation of image data in the first image data generating section 105 can be adjusted. More specifically, in the determining/reference data updating section 104, when a difference between current digital data (voltage value) and the reference data is equal to or more than a threshold value, it is determined that the digital data is to be used for generation of image data, so that, when the threshold value for the difference set higher, the probability that the digital data will be used for generation of image data becomes smaller, and also an amount of image data generated in the first image data generating section 105 becomes smaller. On the contrary, when the threshold value for difference is made smaller, the probability that the digital data will be used for generation of image data becomes larger, and also an amount of image data generated in the first image data generating section 105 becomes larger. Also in addition to change of a threshold value for difference, a clock signal (sampling cycle) may be made variable so that the probability of generation of image data can be adjusted according to both the threshold value for difference and clock signal.

Figure 7A:
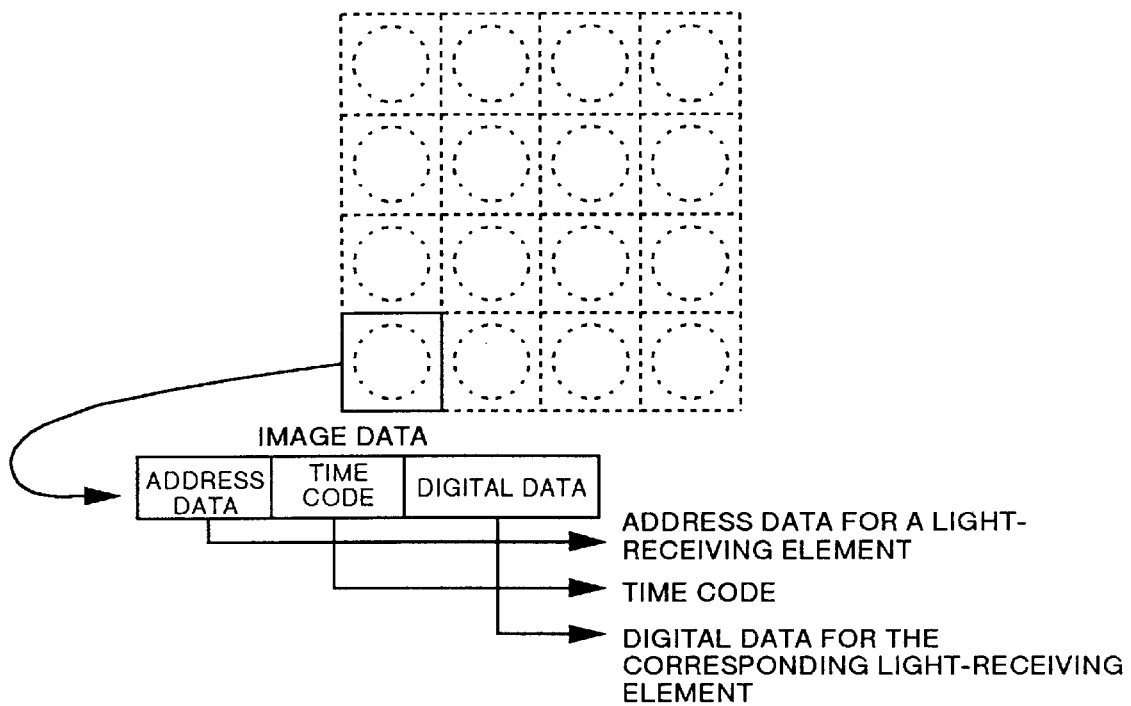
FIGS. 7A and 7B are explanatory views showing a difference between image data generated in a first image generating section and those generating in a second image data generating section in Embodiment 2.
Figure 7B:
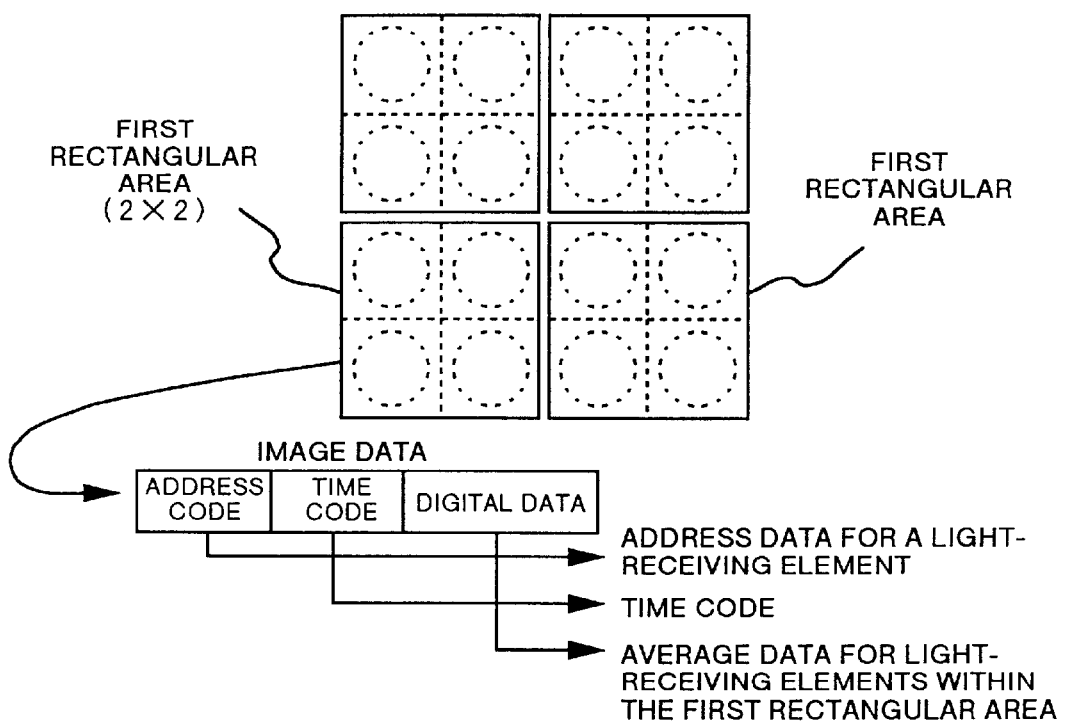

Next description is made for a difference between image data generated in the first image data generating section 105 and image data generated in the second image data generating section 601 with reference to FIG. 7A and FIG. 7B. FIG. 7A shows data structure of image data generated in the first image data generating section 105, for instance, when 16 light-receiving elements are arrayed in the light-receiving section 101. The image data is generated from all the light-receiving elements, and 16 image data are outputted from the first image data generating section 105. Each of the 16 image data has an address data specific to each discrete light-receiving element, time code indicating a time for generation of image data, and digital data (voltage value) for the corresponding light-receiving element. In other words, image data generated in the first image data generating section 105 is those for each light-receiving element, and a light-receiving element can be identified from address data in the image data.

FIG. 7B shows data structure of image data generated in the second image data generating section 601, and in a case where 16 light-receiving elements arrayed in the light-receiving section 101 are grouped into 4 rectangular areas comprising 2×2 light-receiving element is set as a first rectangular area. When image data is generated from all the first rectangular areas, 4 image data are outputted from the second image data generating section 601. Each of the image data has an address data specific to the respective first rectangular area, time code indicating a time for generation, and average of the digital data for the 4 light-receiving elements in the respective first rectangular area. In other words, image data generated in the second image data generating section 601 is for each first rectangular area, and a first rectangular area (namely, 4 light-receiving elements in the corresponding first rectangular areas) can be identified.

For this reason, as clearly understood from FIG. 7A and FIG. 7B, by using image data generated in the second image data generating section 601, it is possible to transmit digital data for $2^n \times 2^n$ light-receiving elements as one piece of image data. In other words, a quantity of data to be processed can be reduced to $1/(2^n \times 2^n)$ as compared to a quantity of image data generated in the first image data generating section 105.

Figure 8:
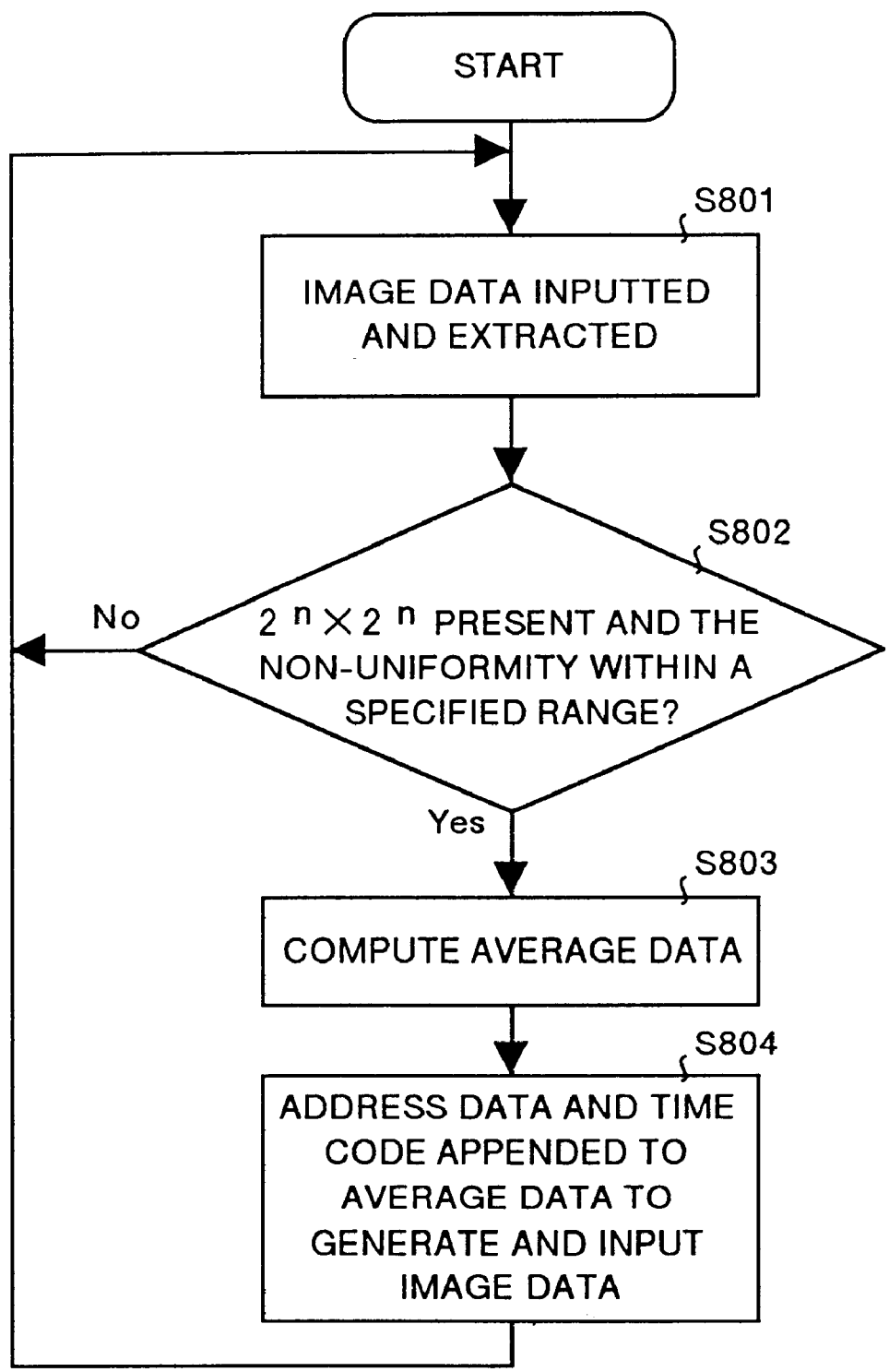
FIG. 8 is a flow chart for image data input in the second image data generating section in Embodiment 2.

With the configuration described above, next description is made for operations thereof with reference to the flow chart shown in FIG. 8. It should be noted that the basic operations are the same as those in Embodiment 1 and description is made herein only for different portions.

FIG. 8 is a flow chart for image data input processing in the second image data generating section 601, and image data for each light-receiving element generated in the first image data generating section 105 is inputted, and then image data, address data for light-receiving element of which is address data within a preset first rectangular area and has the same address code, is extracted from the address data and time code appended to the image data (S801).

Then, it is determined whether there exist $2^n \times 2^n$ pieces of extracted data and also whether non-uniformity of digital data is within a specified range or not (S802). When the non-uniformity is within the specified range, average data is obtained by averaging the digital data in the $2^n \times 2^n$ pieces of image data (S803), specific address data preset for the first rectangular area and time code are appended to the average data, image data for the corresponding first rectangular area is generated and inputted (S804), and then system control returns to step S801.

As described above, with the Embodiment 2, as image data for a plurality of light-receiving element can be grouped into image data for one first rectangular area in the second image data generating section 601, it is possible to efficiently reduce a total number of image data without losing consistency between image data. It should be noted that, although both image data (for each light-receiving element) in the first image data generating section 105 and image data (for each first rectangular area) for the second image data generating section 601 are generated and inputted in FIG. 6, image data for those light-receiving elements whose image data is inputted by the second image data generating section may not be inputted. In this case, in FIG. 6, image data (for each light-receiving element) generated in the first image data generating section 105 is outputted only to the second image data generating section 601, and image data (for each light-receiving element) not used in generation of image data (for each first rectangular area) in the second image data generating section 601 is passed through.

Furthermore, by changing a threshold value for difference, the probability of generation of image data can be adjusted, so that sensitivity in image data input with the digital image input device can be adjusted.

In Embodiment 2, in step S803, average data is computed from digital data in the $2^n \times 2^n$ pieces of image data, and in step S804 image data for a first rectangular area is generated and inputted by using this average data, but in place of computing and using the average data, for instance, by summing up a distribution of digital data in the $2^n \times 2^n$ pieces of image data, digital data with the highest frequency may be decided as digital data representing the $2^n \times 2^n$ pieces of image data to generate image data for the first rectangular area. Also a maximum value or a minimum value of the digital data in the $2^n \times 2^n$ pieces of image data may be used as image data for the first rectangular area.

Other various ways for obtaining image data for a first rectangular area are conceivable once it is understood that, when $2^n \times 2^n$ pieces of image data are within a certain error range, image data having a different resolution level (those for a first rectangular area with lower resolution) can be generated.

Figure 9:
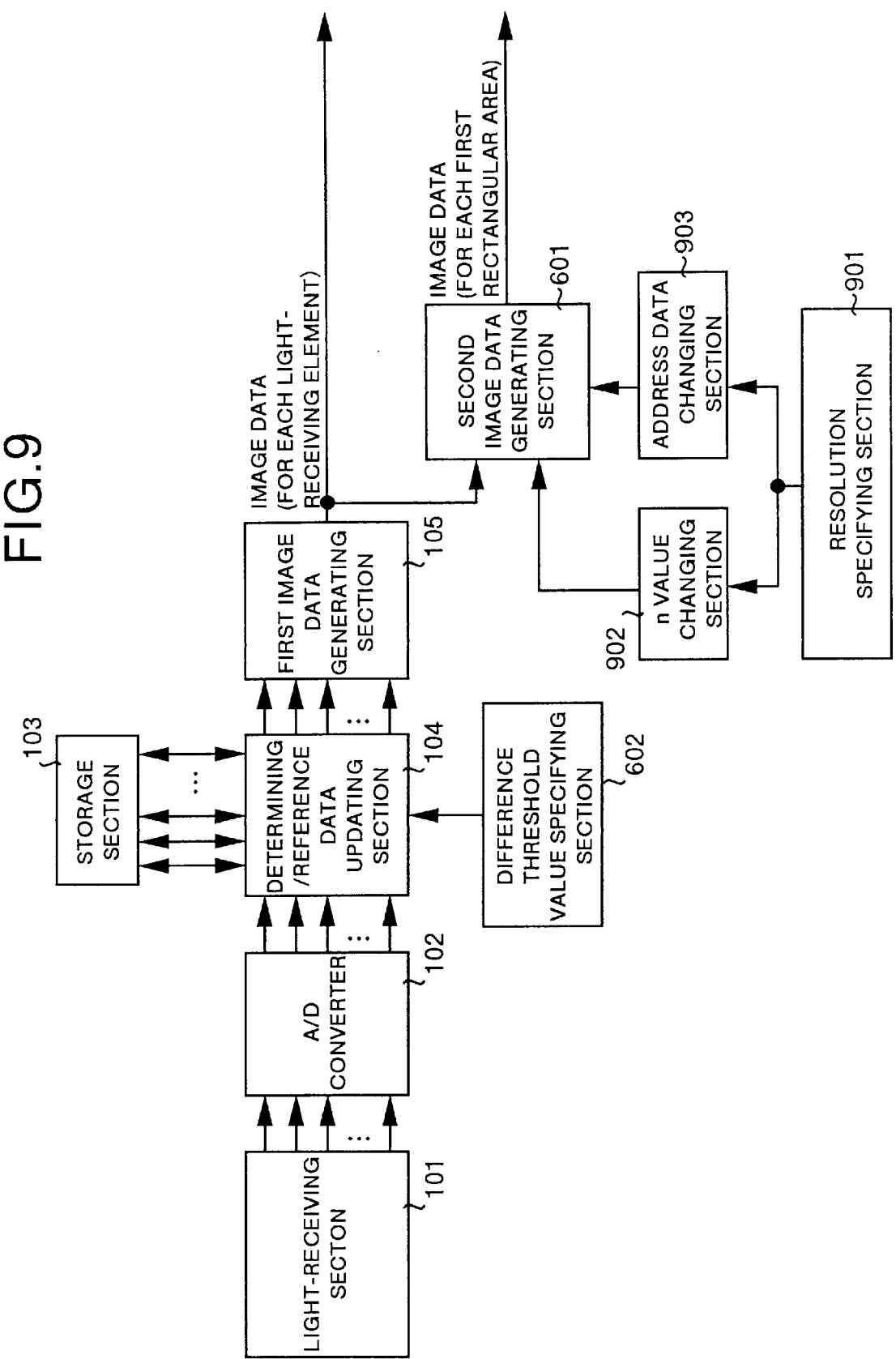
FIG. 9 is a block diagram showing a digital image input device according to Embodiment 3.

FIG. 9 is a block diagram showing a digital image input device according to Embodiment 3 of the present invention. In the digital image input device according to Embodiment 3, a resolution specifying section 901 for specifying resolution of image data, an n-value changing section 902 for changing an n value restricting size of a first rectangular area according to the resolution specified in the resolution specifying section 901, and an address data changing section 903 for changing specific address data preset for the first rectangular area according to the resolution specified in the resolution specifying section 901 are added to the digital image input device according to Embodiment 2 shown in FIG. 6. It should be noted that the remaining configuration is the same as that in Embodiment 2 and description is made herein for only the different portions.

As the resolution specifying section 901, for instance, an operating display section in a digital image input device or the like can be used. It is assumed herein that the resolution, which can be specified with the resolution specifying section 901, ranges from level 0, namely the highest resolution in a case where one light-receiving element is specified as one pixel unit, to level 1 where 2×2 pieces of light-receiving elements are specified as one pixel unit, level 2 where $2^2 \times 2^2$ pieces of light-receiving element are specified as one pixel unit, level 3 where $2^2 \times 2^3$ pieces of light-receiving elements are specified as one pixel unit, . . . , up to level i (i: natural number) where $2^i \times 2^i$ pieces of light-receiving elements are specified as one pixel unit.

Figure 10A:
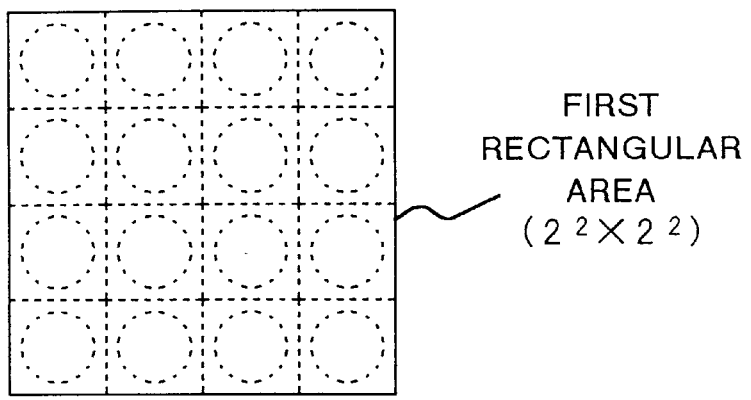
FIGS. 10A and 10B are explanatory views showing a relation between resolution (level) and a value of n that defines the size of a first rectangular area in Embodiment of the present invention.
Figure 10B:
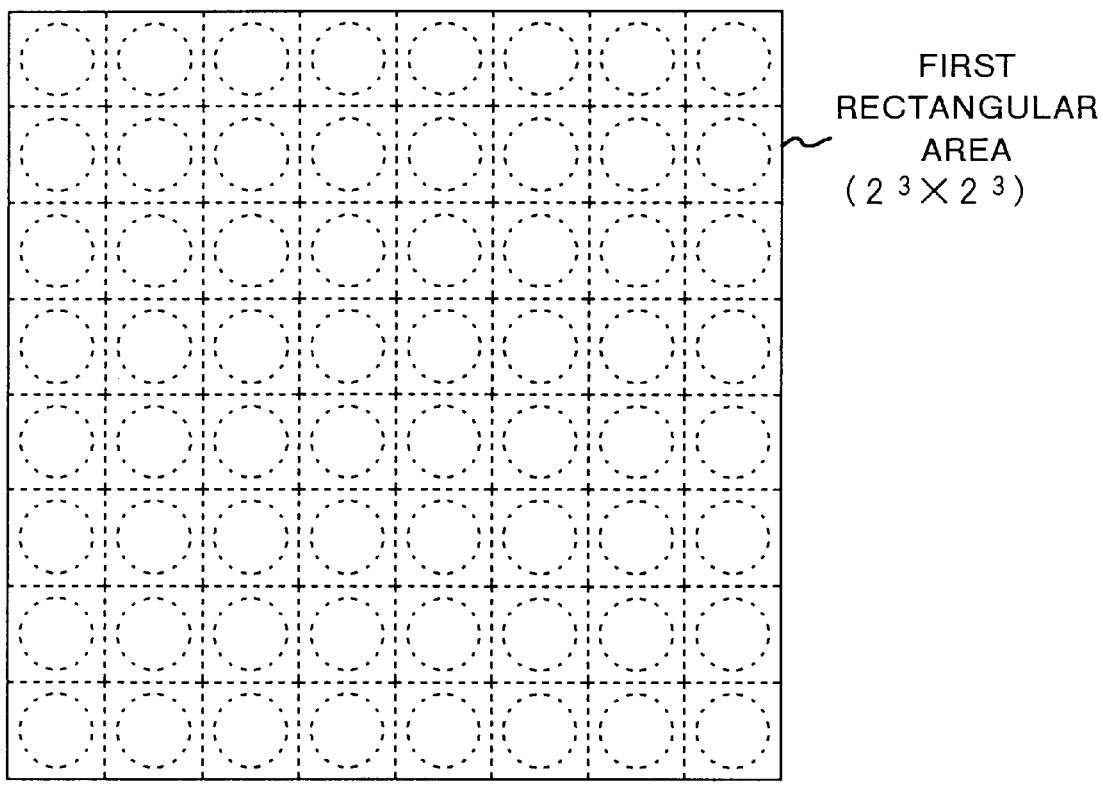

The n value changing section 902 changes the value of n (a value of n in $2^n \times 2^n$) to change the size of a first rectangular area in the second image data generating section 601 according to the resolution (level) specified in the resolution specifying section 901. For instance, in a case where the resolution has a level 2, as shown in FIG. 10A, n is set to 2, and size of the first rectangular area becomes $2^2 \times 2^2$. In a case where the resolution has a level 3, as shown in FIG. 10B, n is set to 3, and size of the first rectangular area becomes $2^3 \times 2^3$.

The address data changing section 903 changes address data for the first rectangular area according to the resolution (level) specified in the resolution specifying section 901. For instance, in a case where resolution has level 0, address data for the first rectangular data is changed with pattern A, in a case where resolution has level 1, address data for the first rectangular area is changed with pattern B, and in a case where the resolution has level 2, address data for the first rectangular area is changed with pattern C, and thus address data is changed with a different pattern according to level i of the resolution. With this feature, address data for a first rectangular area is changed to address data specific to resolution.

With the configuration described above, description is made for operations thereof. At first, when resolution (level) is specified via the resolution specifying section 901 before photographing is started, value of n and address data for the first rectangular area are changed by the n value changing section 902 and address data changing section 903 respectively.

Then, when image data for each light-receiving element generated in the first image data generating section 105 is inputted into the second image data generating section 601, image data, address data for the light-receiving element of which is address data in the changed first rectangular area and has the same time code, is extracted from the address data and time code appended to the image data. Then, when there are $2^n \times 2^n$ pieces of extracted image data, average data is obtained by averaging digital data in the $2^n \times 2^n$ pieces of extracted data, and address data specific to the corresponding first rectangular area and time code are appended to the average data to generate and input image data for the first rectangular area. It should be noted that, as always average data is generated, determination is not made as to whether non-uniformity of digital data in the $2^n \times 2^n$ pieces of image data is within a specified range or not.

With the Embodiment 3 described above, size of a first rectangular area in the second image data generating section 601 can be changed by the resolution specifying section 901, n value changing section 902 and address data changing section 903, so that image data corresponding to the specified resolution can be generated. In other words, resolution can be specified, and also a quantity of required data can be increased or decreased according to the specified resolution.

FIG. 11 is a block diagram showing a digital image input device according to Embodiment 4 of the present invention. In the digital image input device according to Embodiment 4, a third image data generating section 1101 is added to the digital image input device according to Embodiment 2 shown in FIG. 6. It should be noted that other portions are the same as those in Embodiment 2 and description is made herein for only different portions.

The third image data generating section 1101 receives image data for the first rectangular area generated in the second image data generating section 601, extracts image data, address data for the first rectangular area of which is address data within a second rectangular area consisting of preset $2^m \times 2^m$ pieces (m: natural number) pieces of first rectangular area and has the same time code, and when there are $2^m \times 2^m$ pieces of extracted image data and at the same time non-uniformity of digital data in the $2^m \times 2^m$ pieces of image data is within a specified range, computes average data obtained by averaging digital data in the $2^m \times 2^m$ pieces of image data, and append specific address data preset for the second rectangular area and time code to the average data to generate image data for the second rectangular area.

Figure 12A:
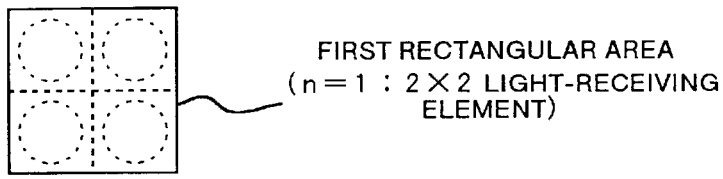
FIGS 12A–12C show different sizes of the first rectangle and containing light receiving elements.
Figure 12B:
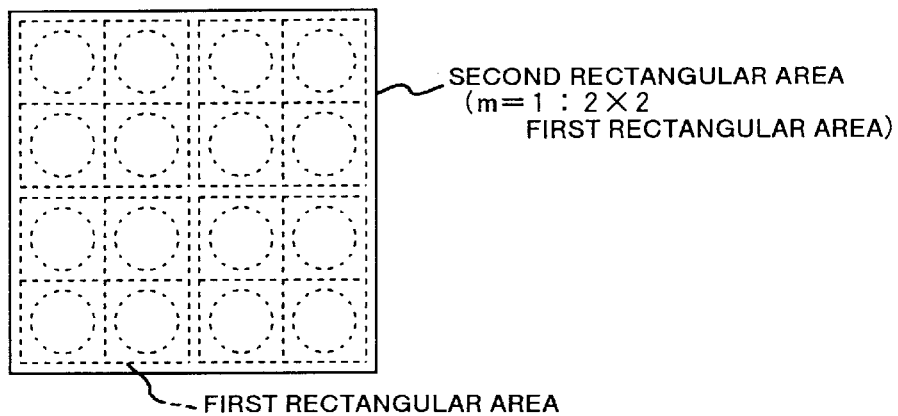
Figure 12C:
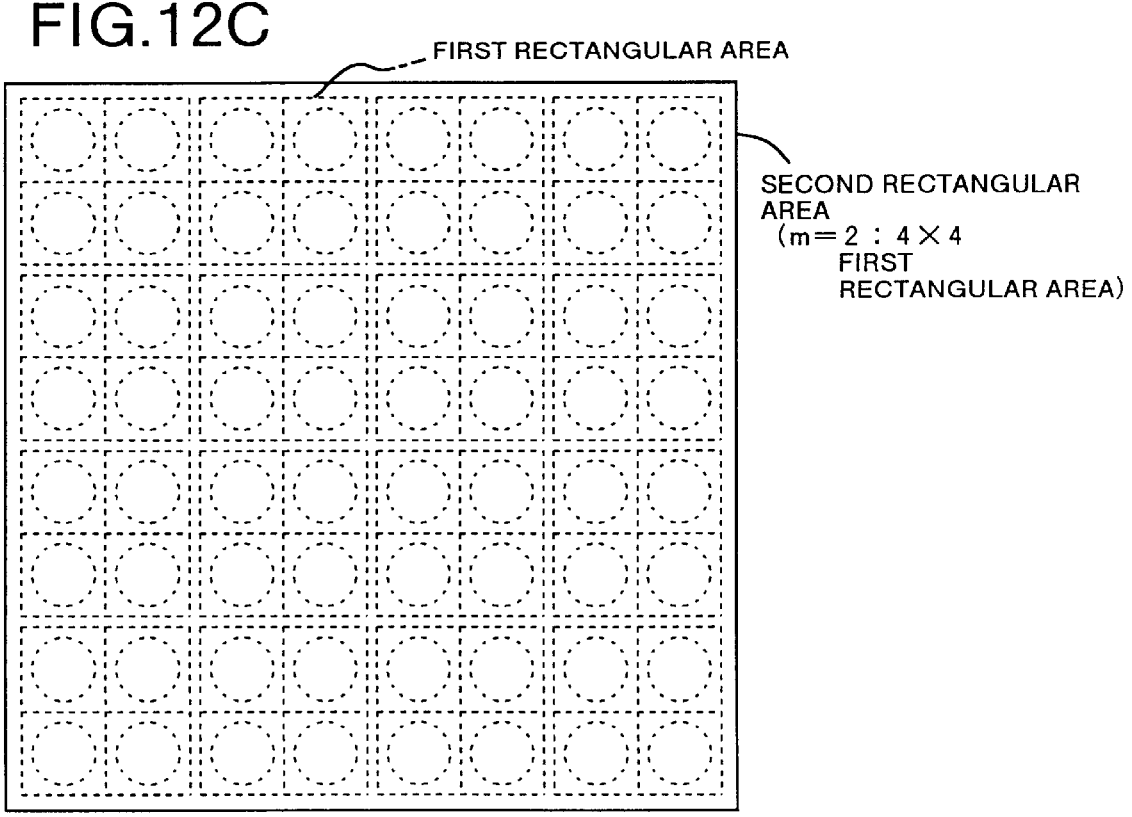

Herein, for instance, as shown in FIG. 12A, in a case where size of the first rectangular area in the second image data generating section 601 is 2×2 of light-receiving elements, it is possible to set size of a second rectangular area in the third image data generating section 1101 to size corresponding to 2×2 pieces of first rectangular areas as shown in FIG. 12B, or to size corresponding to 4×4 pieces of first rectangular area as shown in FIG. 12C.

With the digital image input device according to Embodiment 4, it is possible to group image data for a plurality of first rectangular areas into image data for one second rectangular area in the third image data generating section 1101 in addition to such a grouping in the second image data generating section 601, so that a total number of image data to be processed can efficiently be reduced without losing consistency between image data. Also image data each having different resolution such as image data for each light-receiving element, image data for each first rectangular area, and image data for each second rectangular area can be generated.

Further, as a variation of Embodiment 4, the configuration is allowable in which a plurality of third image data generating sections 1101 are arrayed in series, a second rectangular area having different address data is provided for each of the third image data generating section 1101, and image data for the second rectangular area outputted from the third image data generating section 1101 provided at the head is inputted as image data for the first rectangular area into the third image data generating section 1101 in the next stage. With the configuration as described above, a total number of image data to be processed can efficiently be reduced without losing consistency between image data.

A digital image input device according to Embodiment 5 of the present invention accumulates a change rate of voltage values generated by light-receiving elements, and generates and inputs, when the accumulated value of the change rate is not within a preset range, image data using the voltage value at the point of time.

Figure 13:
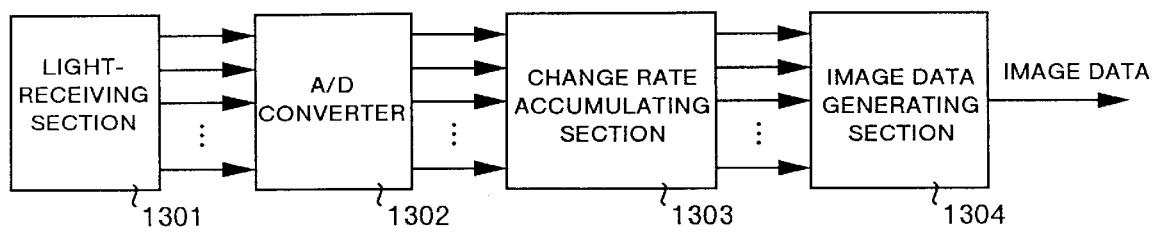
FIG. 13 is a block diagram showing a digital image input device according to Embodiment 5 of the present invention.

FIG. 13 is a block diagram showing the digital image input device according to Embodiment 5, and the digital image input device according to Embodiment 5 comprises a light-receiving section 1301 comprising a plurality of light-receiving elements each for converting received light to electricity and outputting a voltage value (analog data) corresponding to amplitude of the received light; an A/D converter 1302 for inputting voltage values from the plurality of light-receiving elements in the light-receiving section 1302 and converting a voltage value from each light-receiving element (analog data) to digital data; a change rate accumulating section 1303 for receiving digital data for each light-receiving element from the A/D converting section 1302, accumulating a change rate in digital data generated by each light-receiving element for each light-receiving element, and outputting, when the accumulated value of the change rate is not within a preset range, the digital data at the point of time. There is an image data generating section 1304 for receiving digital data from the change rate accumulating section 1303, appending address data preset for each light-receiving element and time code indicating a time for generation of image data to the digital data, and generating the digital data as image data for the light-receiving element.

Figure 14:
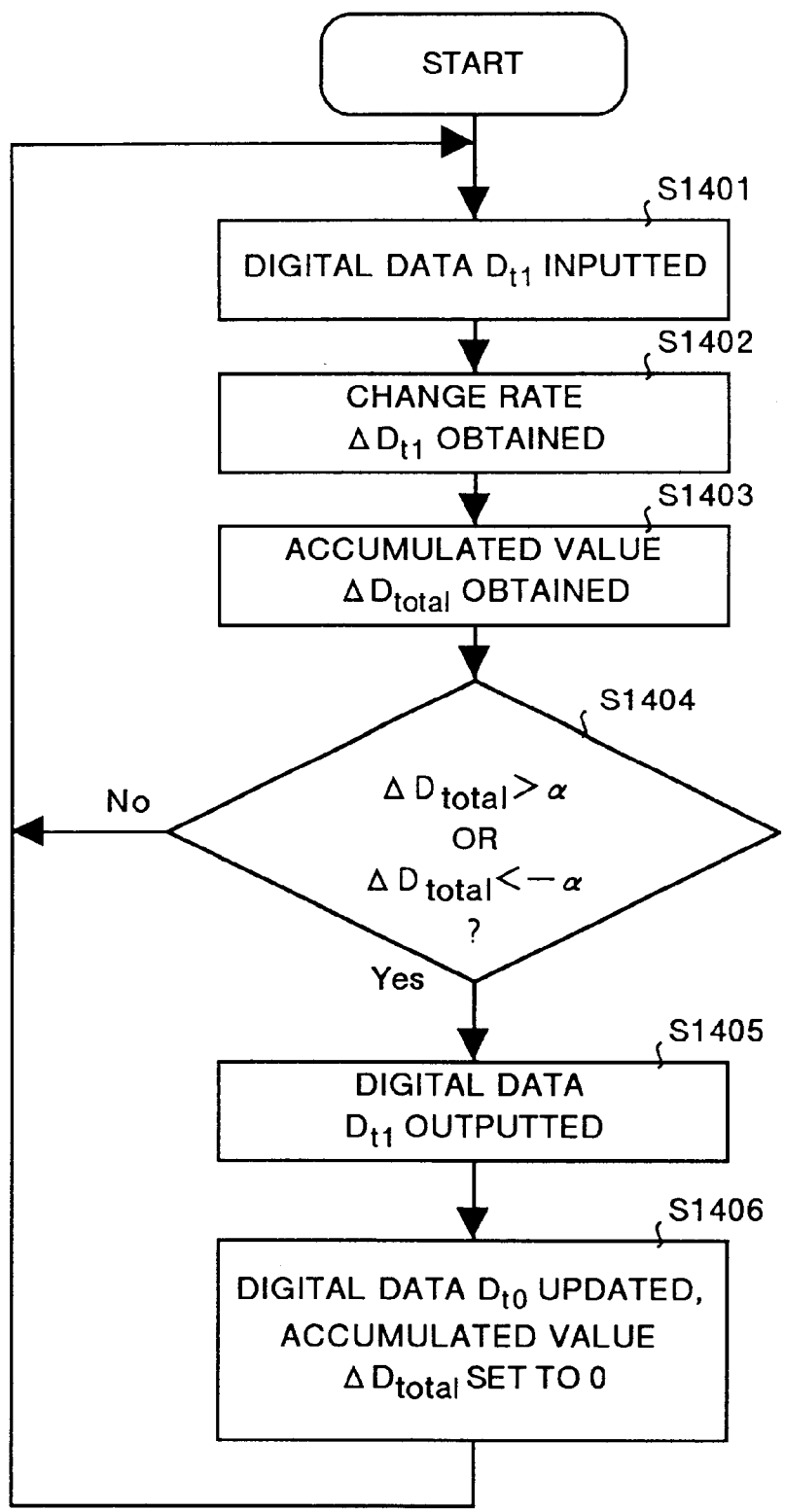
FIG. 14 is a flow chart showing processing by a light-receiving element unit in a change rate accumulating section in Embodiment 5.

FIG. 14 is a flow chart showing the processing by each light-receiving element in the change rate accumulating section 1303. At first, when digital data from each light-receiving element is received from the A/D converter 1302 (S1401), a change rate $\Delta D_{r1}$, of digital data $D_{r1}$ received last against the previous digital data $D_{r0}$ used when the previous image data is generated is computed (S1402), and the change rate $\Delta D_{r1}$ is added to the accumulated value $\Delta D_{total}$ of change rate to update the accumulated value $\Delta D_{total}$ (S1403).

Then determination is made as to whether the accumulated value $\Delta D_{total}$ is within a present range (for instance $\pm\alpha$) or not, and when the value is within the preset range, system control returns to step S1401, and if it not within the preset value, the current digital data $D_{r1}$ is outputted to the image data generating section 1304 (S1405).

Then, the previous digital data $D_{r0}$ is updated with the current digital data $D_{r1}$ with the accumulated value $\Delta D_{total}$ of change rate set to 0 (S1406), and system control returns to step S1401.

With the digital image input device (digital image input method) according to Embodiment 5, the same effects can be achieved using a method different from that in Embodiment 1.

As described above, in the light-receiving element unit according to the present invention, the image data input unit therein comprises an A/D converting unit for receiving analog data from the light-receiving element and converting the received analog data to digital data; a storage unit for storing therein reference data used for determination as to whether image data is to be generated or not; a determining unit for receiving the digital data from the A/D converting unit, computing a difference between the digital data and the reference data stored in the storage unit, and determining, when an absolute value of the difference is equal to or more than a preset threshold value for the difference, that the digital data is digital data to be used for generation of the image data; an image data generating unit for generating, when it is determined by the determining unit that the digital data is to be used for generation of the image data; and a reference data updating unit for updating, when it is determined by the determining unit that the digital data is to be used for generation of the image data, the reference data by using appropriate digital data; and for this reason by making determination as to whether image data is to be generated or not according to a change rate of analog data (voltage value) generated by way of executing photoelectric conversion with a light-receiving element according to amplitude of received light and then inputting image data, only change in a state of an object for photographing or a space as an object for photographing can be generated and inputted without fetching unnecessary image data not including state change (wasteful information). Also image data including state change can be inputted for each light-receiving element unit such as a CCD, so that generation and input of image data (unnecessary information) not including state change can be evaded, and a quantity of image to be processed can be reduced and input of image data can be improved. Further, an increase of image data can be suppressed and smoothness of image when reproduced at a low speed can be improved.

In the light-receiving element unit according to the present invention, the image data generating unit generates the image data by appending specific address data preset for the light-receiving element and time code indicating a time of generation of the image data to the digital data, so that it is possible to format a change rate in terms of space or time as image data without being restricted by a number of light-receiving elements or an array sequence, nor by a sampling cycle for generation of image data In the light-receiving element unit according the present invention, a time for generation of the image data is decided according to a time when analog data is outputted from the light-receiving element, so that change of a state of an object for photographing or a space as an object for photographing can accurately be managed with a unitary time axis without being affected by time processing required in the image data output unit.

The digital image input device according to the present invention comprises an A/D converting unit for receiving analog data from the plurality of light-receiving elements and converting the analog data received by each light-receiving element to digital data; a storage unit for storing therein reference data used for determination for each of the plurality of light-receiving elements as to whether image data is to be generated or not; a determining unit for receiving digital data corresponding to each of the plurality of light-receiving elements from the A/D converter, computing a difference between the digital data and reference data stored in the storage unit, and determining, when an absolute value of the difference is equal to or more than a threshold value for the difference preset for the light-receiving element, that the digital data for the light-receiving element is to be used for generation of image data; a first image data generating unit for appending, when it is determined by the determining unit that the digital data is to be used for generation of the image data, specific address data preset for each of the light-receiving elements and time code indicating a time for generation of the image data to the digital data and generating image data for the light-receiving element; and a reference data updating unit for updating, when it is determined by the determining unit that the digital data is to be used for generation of the image data, the reference data for the light-receiving element by using the digital data, so that, by making determination as to whether image data is to be generated or not according to a change rage of analog data (voltage value) generated by executing photoelectric conversion with a light-receiving element according to amplitude of received light and then inputting image data, only change in a state of an object for photographing or a space as an object for photographing can be generated and inputted without fetching image data not including state change (unnecessary information). Also by enabling input of image data including state change for each light-receiving element such as a CCD, generation and input of image data not including state change (unnecessary information) can be evaded, and efficiency in reduction of a volume of data to be processed and input of image data can be improved. Further, increase of image data can be suppressed and smoothness of image when reproduced at a low speed can be improved.

The digital image input device according to the present invention further comprises a second image data generating unit for receiving image data for each light-receiving element generated by the first image data generating unit; extracting image data, address data of which is address data within a first rectangular area comprising $2^n \times 2^n$ (n: natural number) pieces of light-receiving elements preset according to the address data, having the same time code; deciding, when there are $2^n \times 2^n$ pieces of extracted data and non-uniformity within the $2^n \times 2^n$ pieces of image data is within a specified range, digital data representing digital data for the $2^n \times 2^n$ pieces of image data; appending specific address data preset for the first rectangular area and the time code to the decided data to generate image data for the first rectangular area, so that a total number of image data can efficiently be reduced without losing consistency between image data.

The digital image input device according to the present invention comprises a second image data generating unit for inputting image data for each light-receiving element generated by the first image data generating unit; extracting image data, address data of which is address data within a first rectangular area comprising $2^n \times 2^n$ pieces (n: natural number) of light-receiving element, having the same time code from the address data and time code appended to the image data; computing average data obtained by averaging, when there are $2^n \times 2^n$ pieces of extracted image data, digital data within the $2^n \times 2^n$ pieces of image data; and appending specific address data preset to the first rectangular area and the time code to the average data to generate image data for the first rectangular area, so that a total number of image data can efficiently be reduced without losing consistency between image data.

The digital image input device according to the present invention comprises a second image data generating unit for receiving image data for each light-receiving element generated by the first image data generating unit; extracting image data, address data of which is address data within a f first rectangular area comprising $2^n \times 2^n$ pieces (n: natural number) of light-receiving element, having the same time code from the address data and time code appended to the image data; computing average data obtained by averaging, when there are $2^n \times 2^n$ pieces of extracted image data, digital data within the $2^n \times 2^n$ pieces of image data; computing average data obtained, when there are digital data within $2^n \times 2^n$ pieces of extracted image data and also non-uniformity of digital data within the $2^n \times 2^n$ pieces of image data is within a specified range, by averaging digital data within the $2^n \times 2^n$ pieces of image data; appending specific address data preset for the first rectangular area and the time code to the average data to generated image data for the first rectangular area, so that a total number of image data can efficiently be reduced without losing consistency between image data.

The digital image input device according to the present invention further comprises a third image data generating unit for receiving image data for the first rectangular area generated by the second image data generating unit; extracting image data, address data for the first rectangular area of which is address data within a second rectangular area comprising preset $2^n \times 2^n$ pieces (n: natural number) of first rectangular area, having the same time code from the address data and time code appended to the image data; computing average data obtained by averaging digital data in the $2^n \times 2^n$ pieces of image data when there are $2^n \times 2^n$ pieces of extracted data and at the same time non-uniformity of digital data within the $2^n \times 2^n$ pieces of image data is within a specified range, and appending specific address data preset for the second rectangular area and the time code to the average data to generate image data for the second rectangular area, so that a total number of image data can further efficiently be reduced.

In the digital image input device according to the present invention, a plurality of the third image data generating units are arranged in series and different address data for the second rectangular area is prepared for each of the plurality of third image data generating units; and also wherein image data for a second rectangular area outputted from the third image data generating unit placed at the head is inputted as image data for a first rectangular area, extracting image data, address data for the first rectangular area of which is address data within the second rectangular area comprising preset $2^n \times 2^n$ pieces (n: natural number) of the first rectangular area, having the same time code from the address data and time code appended to the image data, and computing average data obtained by averaging digital data in the $2^n \times 2^n$ pieces of image data when there are $2^n \times 2^n$ pieces of extracted data and at the same time non-uniformity of digital data within the $2^n \times 2^n$ pieces of image data is within a specified range, and appending specific address data preset for the second rectangular area and the time code to the average data to generate image data for the second rectangular area, so that a total number of image data can further efficiently be reduced.

The digital image input device according to the present invention comprises a resolution specifying unit for specifying resolution of the image data; an n-value changing unit for changing the value of n defining size of the first rectangular area according to the resolution specified by the resolution specifying unit; and an address data changing unit for changing specific address data preset for the first rectangular area according to the resolution specified by the resolution specifying unit, so that a quantity of image data to be processed can be increased or decreased according to resolution.

In the digital image input device according to the present invention, a time for generation of the image data is decided according to a time when analog data is outputted from the light-receiving element, so that change of a state of an object for photographing or a space as an object for photographing can accurately be managed with a unitary time axis without being affected by time required in each of the units above.

The digital image input device according to the present invention further comprises a difference threshold value changing unit for changing a difference threshold value for the determining unit, so that the probability of generation of image data can arbitrarily be changed. In other words, the sensitivity in input of image data with a digital image input device can be adjusted.

In the digital image input method according to the present invention, a change rate of a voltage value generated in a light-receiving element is accumulated, and when the accumulated value of change rate is off from a preset range, image data is generated and inputted by using the voltage value at the point of time, so that only change in a state of an object for photographing or a space as an object for photographing can be generated and inputted without fetching image data not including state change (unnecessary information). Also by enabling input of image data including state change for each light-receiving element such as a CCD, generation and input of image data not including state change (unnecessary information) can be evaded and efficiency in reduction of a quantity of information to be processed and input of image data can be improved. Further increase of image data can be suppressed and also smoothness of image when reproduced at a low speed can further be improved.

In the digital image input method according to the present invention, a voltage value sampled last with a prespecified sampling cycle is compared to a previous voltage value used for generating the previous image data for each light-receiving element, and when an absolute value of a difference between the previous voltage value and the current voltage value is equal to or larger than a preset threshold value, the previous voltage value is updated to the current voltage value, and image data is generated and inputted by using the current voltage value, so that only change of a state of an object for photographing or a space as an object for photographing can be generated and inputted as image data without fetching image data not including state change (unnecessary information). Also by enabling input of image data including state change for each light-receiving element such as a CCD, generation and input of image data not including state change (unnecessary information) can be evaded and efficiency in reduction of a quantity of information to be processed and input of image data can be improved. Further increase of image data can be suppressed and smoothness of images when reproduced at a low speed can be improved.

In the digital image input method according to the present invention, the probability of generation of the image data is adjusted by changing the threshold value, so that the sensitivity in input of image data can be adjusted.

In the digital image input method according to the present invention, the probability of generation of the image data is adjusted by changing the threshold value as well as the sampling cycle, so that the sensitivity in input of image data can be adjusted.

The digital image input method according to the present invention comprises the steps of receiving light by a light-receiving section with a plurality of light-receiving elements arrayed therein; generating a voltage value by converting the light to electricity with each of the light-receiving elements according to amplitude of the received light; and generating and inputting image data using the voltage value; and the image input method further comprises a determining step of receiving a voltage value from each light-receiving element, computing a difference of the voltage value from a reference value for the light-receiving element stored in a specified storage unit, and determining the voltage value for the light-receiving element as a voltage value to be used for generation of image data when an absolute value of the difference is larger than a preset threshold value for the difference; a first image data generating step of generating image data for the light-receiving unit according to the voltage value, specific address data preset for each of the light-receiving elements as well as to time code indicating a time of generation of the image data when it is determined in the determining step that the voltage value is that to be used for generation of the image data; and a reference data updating step of updating a reference value for the light-receiving element stored in the storage unit by using the voltage value when it is determined in the determining step that the voltage value is that to be used for generation of the image data, so that, by making determination as to image data is to be generated or not according to a change rate of analog data (voltage value) generated by means of photo-electric conversion with a light-receiving element according to amplitude of received light and then inputting image data, only change in a state of an object for photographing or a space as an object for photographing can be generated and inputted without fetching image data not including state change (unnecessary information). Also by enabling input of image data including state change for each light-receiving unit such as a CCD, generation and input of image data not including state change (unnecessary information) can be evaded and efficiency in reduction of a quantity of information to be processed and input of image data can be improved. Further smoothness of images when reproduced at a low speed can be improved.

This application is based on Japanese patent applications No. HEI 9-262528 and No. HEI 10-237727 filed in the Japanese Patent Office on Sep. 26, 1997 and Aug. 24, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A light-receiving element unit comprising:
a light-receiving element for converting received light to electricity and outputting analog data corresponding to amplitude of the light;
an image data outputting unit for receiving the analog data from said light-receiving element, converting the analog data to digital data and outputting the digital data as image data; wherein said image data outputting unit comprises:
an A/D converter for converting the analog data received from said light-receiving element to digital data;
a storage unit for storing therein reference data used for determining whether an image data is to be generated or not;
a determining unit for receiving the digital data from said A/D converter, computing a difference between the digital data and the reference data stored in said storage unit, and determining, when an absolute value of the difference is equal to or more than a preset threshold value for the difference, that the digital data is to be used for generation of the image data;
an image data generating unit for generating image data, when it is determined by said determining unit that the digital data is to be used for generation of the image data; and
a reference data updating unit for updating, when it is determined by the determining unit that the digital data is to be used for generation of the image data, the reference data with this digital data.

2. A light-receiving element unit comprising:
a light-receiving element for converting received light to electricity and outputting analog data corresponding to amplitude of the light;
an image data outputting unit for receiving the analog data from said light-receiving element, converting the analog data to digital data and outputting the digital data as image data; wherein said image data outputting unit comprises:
an A/D converter for converting the analog data received from said light-receiving element to digital data;
a storage unit for storing therein reference data used for determining whether an image data is to be generated or not;
a determining unit for receiving the digital data from said A/D converter, computing a difference between the digital data and the reference data stored in said storage unit, and determining, when an absolute value of the difference is equal to or more than a preset threshold value for the difference, that the digital data is to be used for generation of the image data;
an image data generating unit for generating image data, when it is determined by said determining unit that the digital data is to be used for generation of the image data; and
a reference data updating unit for updating, when it is determined by the determining unit that the digital data is to be used for generation of the image data, the reference data with this digital data; wherein said image data generating unit generates the image data by appending specific address data preset for said light-receiving element and time code indicating a time of generation of the image data to the digital data.

3. A light-receiving element unit according to claim 2; wherein a time for generation of the image data is decided according to a time when analog data is outputted from said light-receiving element.

4. A digital image input device comprising;
a plurality of light-receiving elements for converting received light to electricity and outputting analog data corresponding to amplitude of the light;
an image data outputting unit for converting analog data received from each of said light-receiving elements to digital data and outputting the digital data as image data, said image device comprising:
  an A/D converter for said converting the analog data received by each of said light-receiving element to digital data;
  a storage unit for storing therein reference data used for determining for each of said light-receiving elements whether an image data is to be generated or not;
  a determining unit for receiving digital data corresponding to each of said light-receiving elements from said A/D converter, computing a difference between the digital data and reference data stored in said storage unit, and determining, when an absolute value of the difference is equal to or more than a threshold value for the difference preset for corresponding light-receiving element, that the digital data for the light-receiving element is to be used for generation of image data;
  a first image data generating unit for appending, when it is determined by said determining unit that the digital data is to be used for generation of the image data, specific address data preset for each of said light-receiving elements and time code indicating a time for generation of the image data to the digital data and generating image data for the light-receiving element; and
  a reference data updating unit for updating, when it is determined by said determining unit that the digital data is to be used for generation of the image data, the reference data for said light-receiving element with this digital data.

5. A digital image input device according to claim 4 further comprising a second image data generating unit for receiving image data for each light-receiving element generated by the first image data generating unit; extracting image data, address data of which is address data within a first rectangular area comprising $2^n \times 2^n$ (n:natural number) pieces of light-receiving elements preset according to the address data, having the same time code; deciding, when there are $2^n \times 2^n$ pieces of extracted data and non-uniformity within the $2^n \times 2^n$ pieces of image data is within a specified range, digital data representing digital data for the $2^n \times 2^n$ pieces of image data; appending specific address data preset for the first rectangular area and the time code to the decided data to generate image data for the first rectangular area.

6. A digital image input device according to claim 4 further comprising a second image data generating unit for inputting image data for each light-receiving element generated by the first image data generating unit; extracting image data, address data of which is address data within a first rectangular area comprising $2^n \times 2^n$ pieces (n:natural number) of light-receiving element, having the same time code from the address data and time code appended to the image data; computing average data obtained by averaging, when there are $2^n \times 2^n$ pieces of extracted image data, digital data within the $2^n \times 2^n$ pieces of image data; and appending specific address data preset to the first rectangular area and the time code to the average data to generate image data for the first rectangular area.

7. A digital image input device according to claim 6 further comprising:
a resolution specifying unit for specifying resolution of the image data;
an n-value changing unit for changing the value of n defining size of the first rectangular area according to the resolution specified by the resolution specifying unit; and
an address data changing unit for changing specific address data preset for the first rectangular area according to the resolution specified by the resolution specifying unit.

8. A digital image input device according to claim 4 further comprising a second image data generating unit for receiving image data for each light-receiving element generated by the first image data generating unit; extracting image data, address data of which is address data within a first rectangular area comprising $2^n \times 2^n$ pieces (n:natural number) of light-receiving element, having the same time code from the address data and time code appended to the image data; computing average data obtained by averaging, when there are $2^n \times 2^n$ pieces of extracted image data, digital data within the $2^n \times 2^n$ pieces of image data; computing average data obtained, when there are digital data within $2^n \times 2^n$ pieces of extracted image data and also non-uniformity of digital data within the $2^n \times 2^n$ pieces of image data is within a specified range, by averaging digital data within the $2^n \times 2^n$ pieces of image data; appending specific address data preset for the first rectangular area and the time code to the average data to generated image data for the first rectangular area.

9. A digital image input device according to claim 8 further comprising:
a resolution specifying unit for specifying resolution of the image data;
an n-value changing unit for changing the value of n defining size of the first rectangular area according to the resolution specified by the resolution specifying unit; and
an address data changing unit for changing specific address data preset for the first rectangular area according to the resolution specified by the resolution specifying unit.

10. A digital image input device according to claim 8 further comprising a third image data generating unit for receiving image data for the first rectangular area generated by the second image data generating unit; extracting image data, address data for the first rectangular area of which is address data within a second rectangular area comprising preset $2^n \times 2^n$ pieces (n: natural number) of first rectangular area, having the same time code from the address data and time code appended to the image data; computing average data obtained by averaging digital data in the $2^n \times 2^n$ pieces of image data when there are $2^n \times 2^n$ pieces of extracted data and at the same time non-uniformity of digital data within the $2^n \times 2^n$ pieces of image data is within a specified range, and appending specific address data preset for the second rectangular area and the time code to the average data to generate image data for the second rectangular area.

11. A digital image input device according to claim 10; wherein a plurality of the third image data generating units are arranged in series and different address data for the second rectangular area is prepared for each of the plurality of third image data generating units; and also wherein image data for a second rectangular area outputted from the third image data generating unit placed at the head is inputted as image data for a first rectangular area, extracting image data, address data for the first rectangular area of which is address data within the second rectangular area comprising preset $2^n \times 2^n$ pieces (n:natural number) of the first rectangular area, having the same time code from the address data and time code appended to the image data, and computing average data obtained by averaging digital data in the $2^n \times 2^n$ pieces of image data when there are $2^n \times 2^n$ pieces of extracted data and at the same time non-uniformity of digital data within the $2^n \times 2^n$ pieces of image data is within a specified range, and appending specific address data preset for the second rectangular area and the time code to the average data to generate image data for the second rectangular area.

12. A digital image input device according to claim 4; wherein a time for generation of the image data is decided according to a time when analog data is outputted from the light-receiving element.

13. A digital image input device according to claim 4 further comprising:
   a difference threshold value changing unit for changing a difference threshold value for the determining unit.

14. A digital image input method comprising the steps of:
   receiving light by a light-receiving section with a plurality of light-receiving elements arrayed therein;
   generating a voltage value by converting the light to electricity with each of the light-receiving elements according to amplitude of the received light; and
   generating and inputting image data using the voltage value; wherein a change-rate of the voltage value generated by the light-receiving element is accumulated and, when a accumulated value for the change rate goes out of a preset range, image data is generated and inputted using the voltage value at the point of time.

15. A digital image input method comprising the steps of:
   receiving light by a light-receiving section with a plurality of light-receiving elements arrayed therein;
   generating a voltage value by converting the light to electricity with each of the light-receiving elements according to amplitude of the received light; and
   generating and inputting image data using the voltage value; wherein a voltage value sampled last with a prespecified sampling cycle is compared to a previous voltage value used for generating the previous image data for each light-receiving element, and when an absolute value of a difference between the previous voltage value and the current voltage value is equal to or larger than a preset threshold value, the previous voltage value is updated to the current voltage value, and image data is generated and inputted by using the current voltage value, and image data is generated and inputted by using the current voltage value, wherein a probability of generation of the image data is adjusted by changing at least one of the threshold value and the sampling cycle.

16. A digital image input method according to claim 15; wherein a probability of generation of the image data is adjusted by changing the threshold value.

17. A digital image input method according to claim 15; wherein the probability of generation of the image data is adjusted by changing the threshold value as well as the sampling cycle.

18. A digital image input method comprising the steps of:
   receiving light by a light-receiving section with a plurality of light-receiving elements arrayed therein;
   generating a voltage value by converting the light to electricity with each of the light-receiving elements according to amplitude of the received light; and
   generating and inputting image data using the voltage value; and said image input method further comprising:
   a determining step of receiving a voltage value from each light-receiving element, computing a difference of the voltage value from a reference value for the light-receiving element stored in a specified storage unit, and determining the voltage value for the light-receiving element as a voltage value to be used for generation of image data when an absolute value of the difference is larger than a preset threshold value for the difference;
   a first image data generating step of generating image data for the light-receiving unit according to the voltage value, specific address data preset for each of the light-receiving elements as well as to time code indicating a time of generation of the image data when it is determined in the determining step that the voltage value is that to be used for generation of the image data; and
   a reference data updating step of updating a reference value for the light-receiving element stored in the storage unit by using the voltage value when it is determined in the determining step that the voltage value is that to be used for generation of the image data.

* * * * *